March 23, 1948. R. B. HITCHCOCK ET AL Re. 22,991

IMPLEMENT CONSTRUCTION

Original Filed June 10, 1943 8 Sheets-Sheet 1

Inventors:
Rex B. Hitchcock
William C. Rosenthal,
By Paul O. Pipp
Attorney.

March 23, 1948. R. B. HITCHCOCK ET AL Re. 22,991

IMPLEMENT CONSTRUCTION

Original Filed June 10, 1943 8 Sheets-Sheet 2

Inventors:
Rex B. Hitchcock and
William C. Rosenthal,
By Paul O. Piper
Attorney.

March 23, 1948. R. B. HITCHCOCK ET AL Re. 22,991

IMPLEMENT CONSTRUCTION

Original Filed June 10, 1943 8 Sheets-Sheet 3

Inventors:
Ray B. Hitchcock and
William C. Rosenthal,
By Paul O. Pippel
Attorney.

IMPLEMENT CONSTRUCTION

Original Filed June 10, 1943 8 Sheets-Sheet 4

Inventors:
Rex B. Hitchcock
William E. Rosenthal,
By Paul O. Pippel
Attorney.

March 23, 1948. R. B. HITCHCOCK ET AL Re. 22,991

IMPLEMENT CONSTRUCTION

Original Filed June 10, 1943 8 Sheets-Sheet 5

Inventors:
Rex B. Hitchcock and
William E. Rosenthal,
By Paul O. Pippel
Attorney.

March 23, 1948. R. B. HITCHCOCK ET AL Re. 22,991
IMPLEMENT CONSTRUCTION
Original Filed June 10, 1943 8 Sheets-Sheet 6
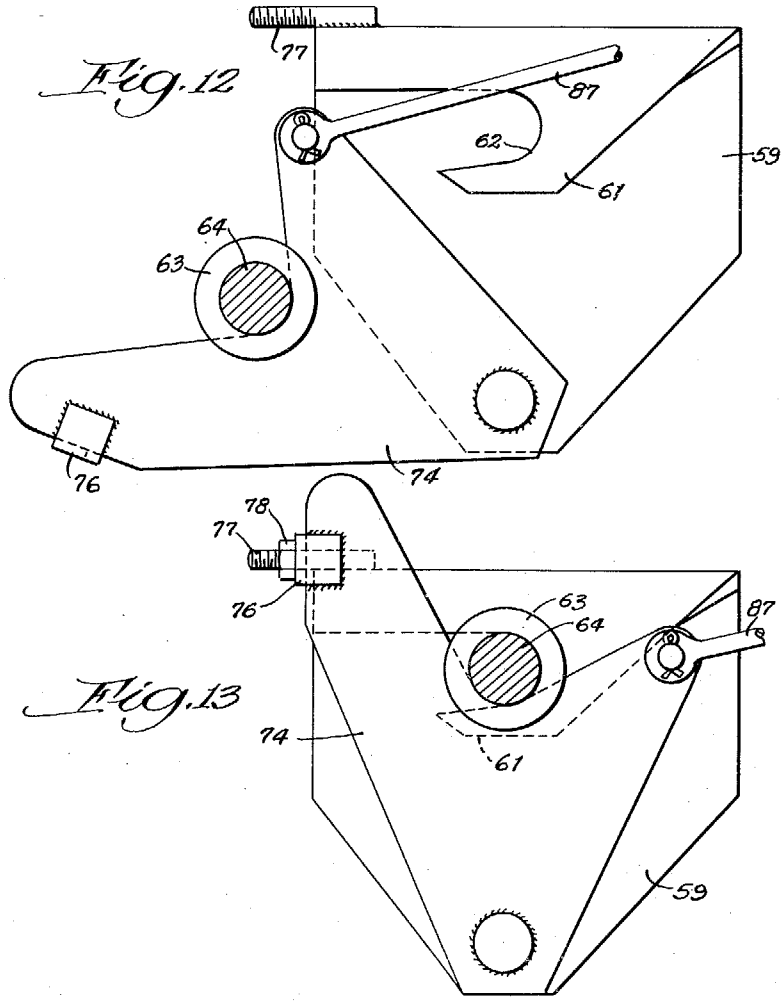
Fig. 12
Fig. 13
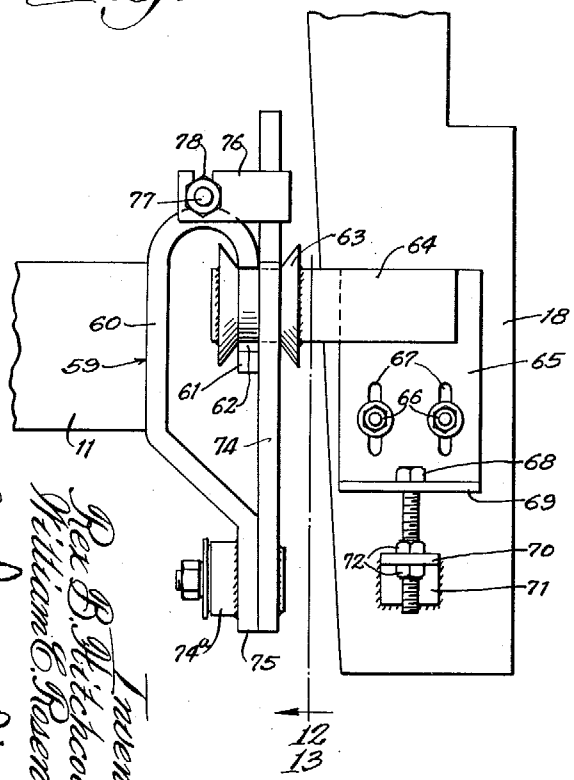
Fig. 11
Inventors
Rex B. Hitchcock and
William C. Rosenthal,
By Paul O. Pipper
Attorney.

March 23, 1948. R. B. HITCHCOCK ET AL. Re. 22,991

IMPLEMENT CONSTRUCTION

Original Filed June 10, 1943 8 Sheets-Sheet 7

Inventors:
Rex B. Hitchcock and
William C. Rosenthal,
By Paul O. Pippel,
Attorney.

March 23, 1948. R. B. HITCHCOCK ET AL Re. 22,991

IMPLEMENT CONSTRUCTION

Original Filed June 10, 1943 8 Sheets-Sheet 8

Inventor:
Rex B. Hitchcock
William C. Rosenthal,
By Paul Pippel
Attorney.

Reissued Mar. 23, 1948

Re. 22,991

UNITED STATES PATENT OFFICE 22,991

IMPLEMENT CONSTRUCTION

Rex B. Hitchcock, Brussels, Belgium, and William C. Rosenthal, Chicago, Ill., assignors to International Harvester Company, a corporation of New Jersey Original No. 2,376,539, dated May 22, 1945, Serial No. 490,267, June 10, 1943. Application for reissue August 21, 1946, Serial No. 691,894

41 Claims. (Cl. 56—20)

This invention relates to an implement mounting and lift. More specifically it relates to means for lifting an implement such as a harvester thresher into a mounted position upon a tractor.

In the case of large tractor-mounted implements, such as harvester threshers or corn pickers, considerable difficulty is experienced in connecting and disconnecting the implement to and from a tractor. The harvester thresher or corn picker is large and unwieldy. It is heavy and so may sink into the ground when allowed to remain for some time detached from a tractor. Likewise, the tractor may be lowered as the weight of the implement is assumed by the tractor when the implement is being mounted. Thus, any lifting means that is to raise an implement from a detached, self-supporting position to a raised, mounted position must have sufficient flexibility to allow for relative changes in position between the implement and the tractor.

An object of the present invention is to provide improvements in tractor-mounted implements.

A further object is the provision of an improvement in the mounting of a tractor-mounted harvester thresher.

Another object is to provide improvements in the mounting of an implement adapted for operation with the tractor running backwards.

Still another object is to provide an improvement in the mounting of a harvester thresher upon a tractor, the harvester thresher operating with the tractor running backwards.

A still further object is to provide means for raising an implement from an inoperative position in which it rests upon the ground to an operating position in which it is raised and mounted upon a tractor.

Another object is the provision of means for accomplishing the same thing for a harvester thresher.

A further object is to provide means for utilizing tractor power to raise an implement from an inoperative, detached position to a raised, mounted position.

A still further object is the provision of means for lifting an implement to mounted position upon a tractor, in which position the tractor is to operate with the tractor running forwardly.

Another object is to provide means for mounting an implement in position alongside the tractor body and within the wheel line.

A further object is to provide means for mounting a harvester thresher in position upon a tractor, the harvester thresher extending along the tractor body immediately adjacent thereto and across the tractor rear axle.

Other objects will appear from the disclosure.

According to the present invention, an implement, such as a harvester thresher, is lifted from an inoperative position in which it rests upon the ground to an operative position in which it is raised and mounted upon a tractor by power-operated lifting members moving angularly about the tractor rear axle and by a power-operated lifting member mounted at the front of the tractor body. In its mounted position, the harvester thresher extends alongside the tractor body and immediately adjacent thereto across the rear axle. The rear end of the thresher body is at the front of the tractor, and the harvester platform extends rearwardly of the tractor rear axle. In one form of the invention both ends of the implement are lifted simultaneously to mounted position upon the tractor. In the other form of the invention one end of the implement is raised to mounted position, and then the other end of the implement is adjusted upwardly to various positions above ground-engaging position.

In the drawings:

Figure 11 is a detail view, showing the mounting of the rear end of the harvester thresher upon the front end of a tractor;

Figure 12 is a sectional view taken along the line 12 of Figure 11 but with the harvester thresher detached from the tractor;

Figure 13 is a sectional view taken on the line 13 of Figure 11 and showing the harvester thresher in mounted position;

Figure 14 is a sectional view taken on the line 14 of Figure 5, with certain parts omitted;

Figure 1:
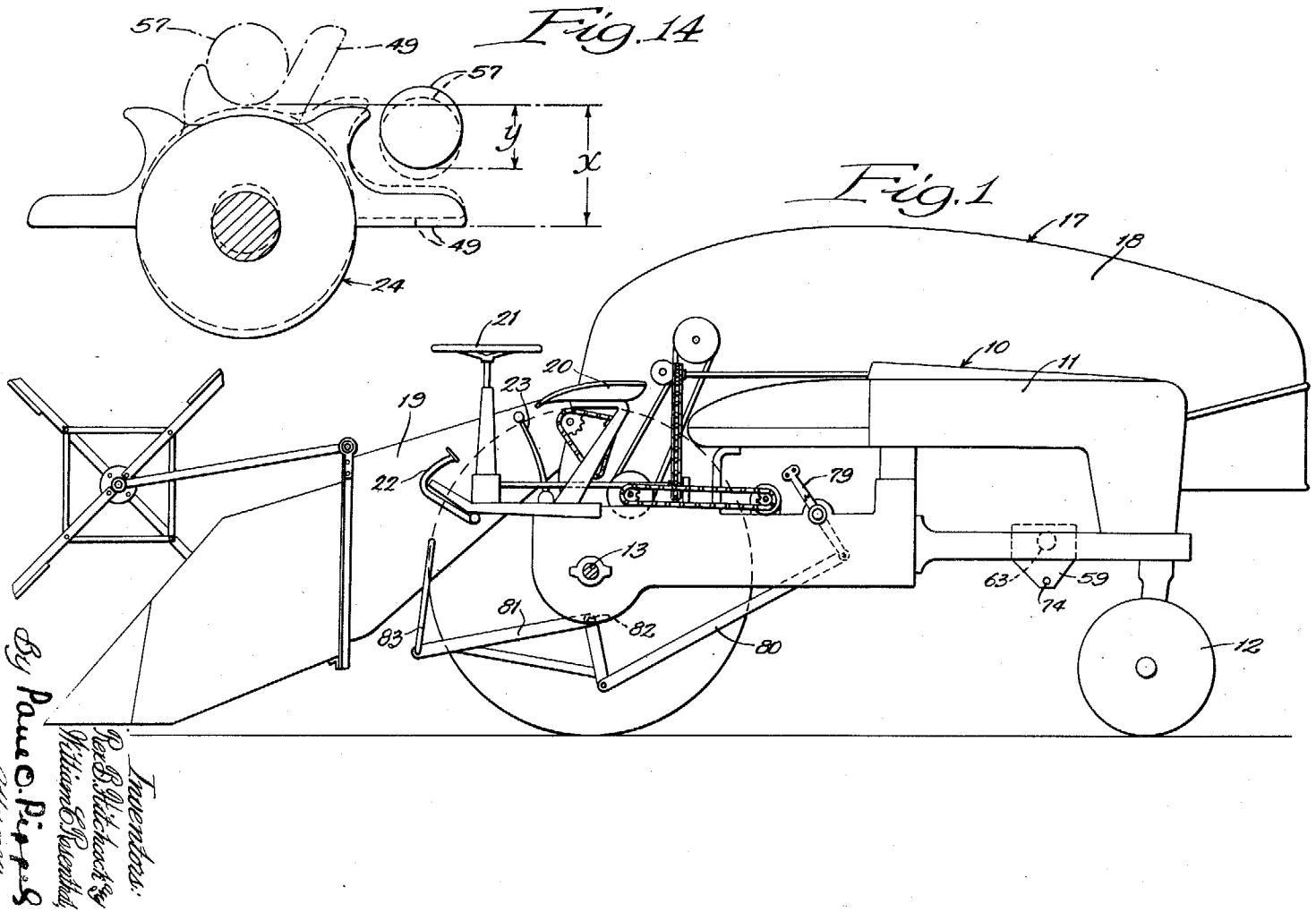
Figure 1 is a side view, with parts removed, of a harvester thresher and a tractor upon which the harvester thresher is mounted.
Figure 2:
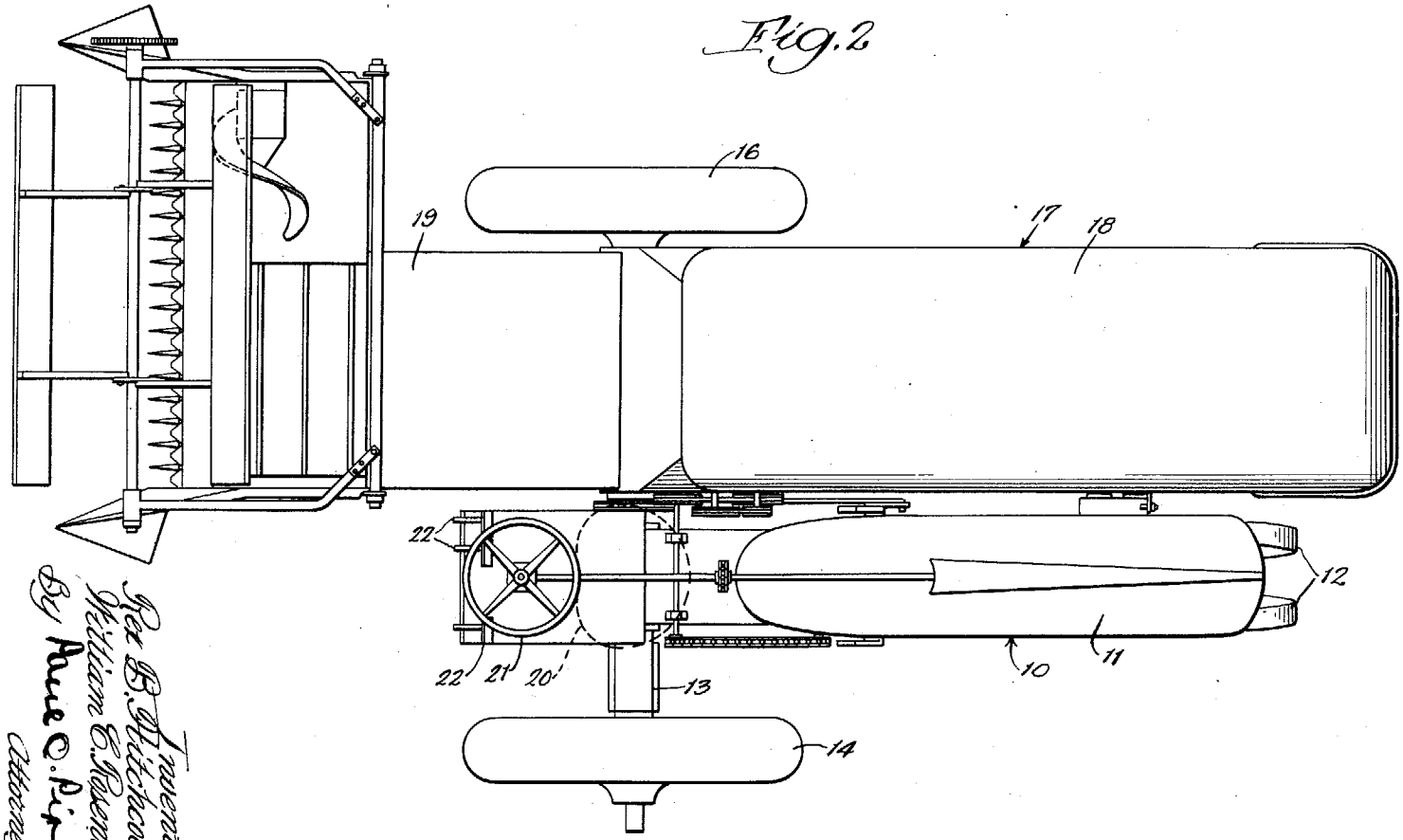
Figure 2 is a plan view of the harvester thresher and tractor of Figure 1.
Figure 3:
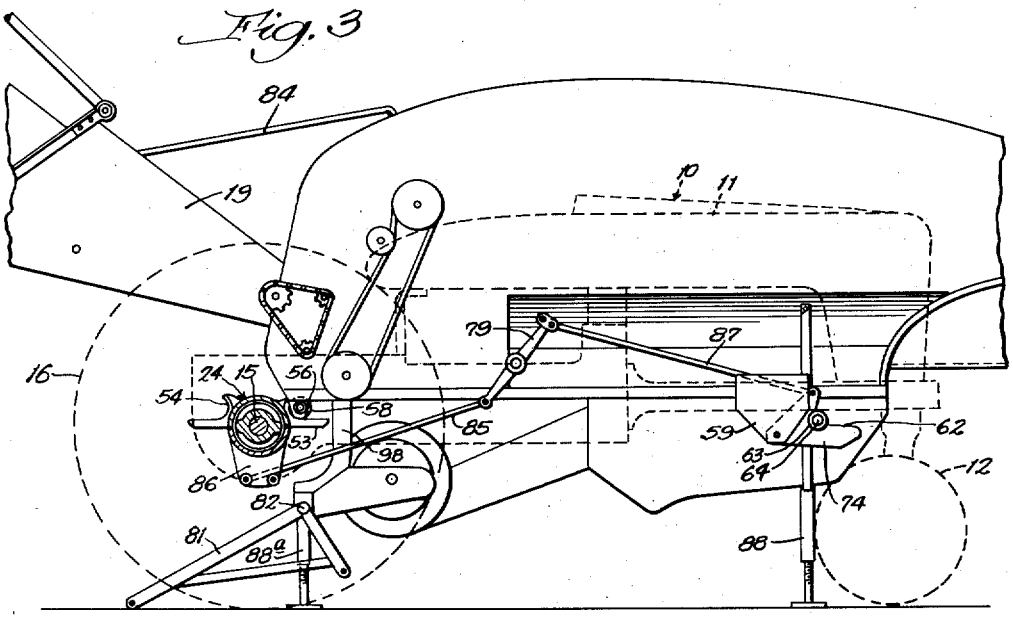
Figure 3 is a side view of the harvester thresher in detached position and the tractor immediately adjacent the harvester thresher.
Figure 4:
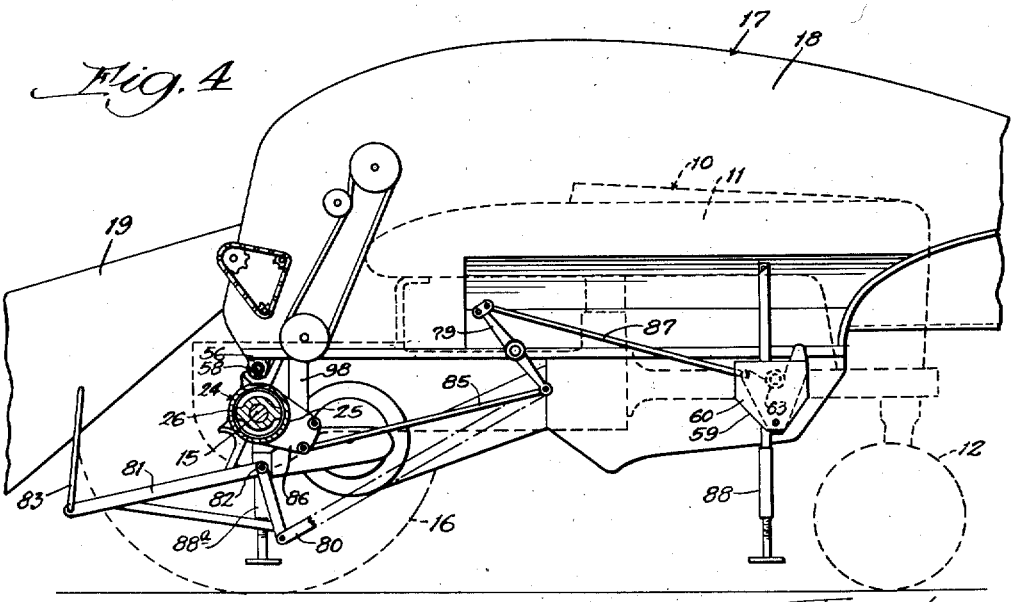
Figure 4 is a side view of the tractor and the harvester thresher moved from the detached position of Figure 3 to mounted position.

Figures 1 and 2 show as a wheeled supporting frame, a tractor 10 comprising a narrow body 11, a narrow front rolling support 12, a short right end rear axle 13, a wheel 14 connected to the axle near the body 11, a long rear axle 15 at the left side of the tractor body 11, and a rear wheel 16 connected to the axle 15 and held spaced from the tractor body 11. Positioned at the left-hand side of the tractor body 11 is a harvester thresher 17 comprising a thresher body 18 and a harvester part 19. Figures 1 and 4 show the harvester thresher in a raised and operative position carried by the tractor at one side of the body and in the implement attaching space between the body and the widely spaced wheel 16. Figure 3 shows the harvester thresher resting on the ground in an inoperative position. The rear end of the thresher body 18 is adjacent the front of the tractor body 11, and the harvester part 19 is pivotally connected to the front of the thresher body 18 generally above the left tractor axle 15 and extends well to the rear of the axle 15. The tractor 10 has an operator's seat 20, a steering wheel 21 positioned forwardly of the seat 20, and control members 22 and 23 within reach of an operator upon the seat 20. When the harvester thresher is employed for gathering and threshing crops, the tractor 10 is run rearwardly.

Figure 5:
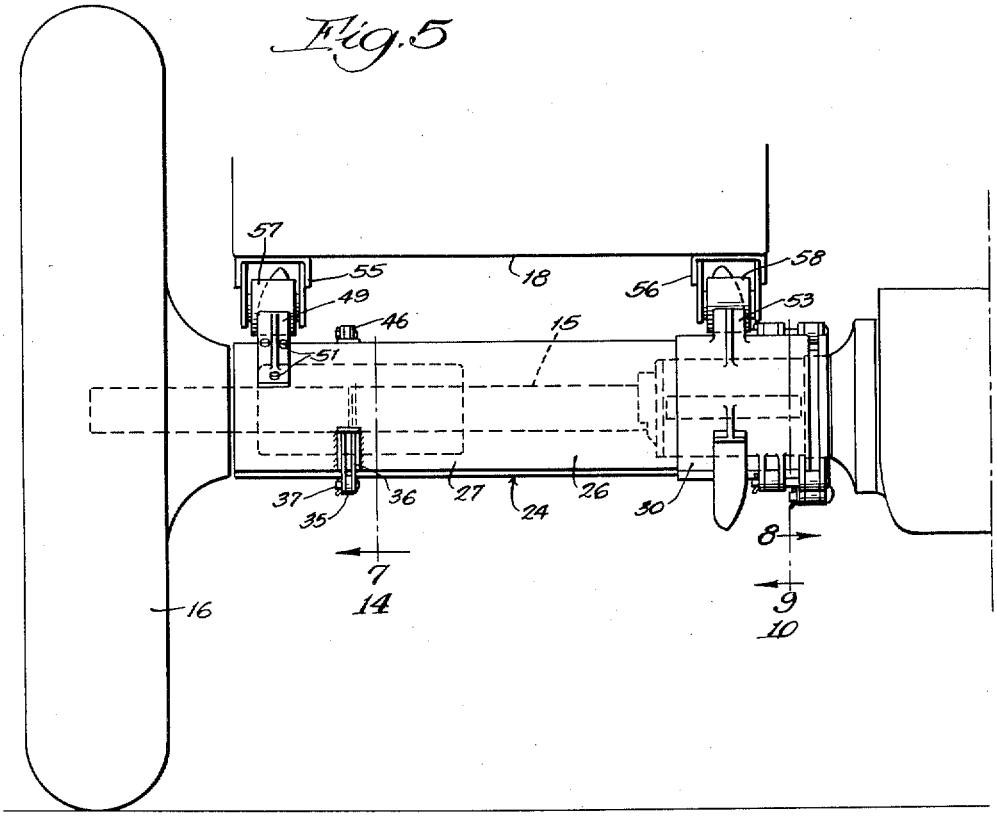
Figure 5 is an end view of a portion of the tractor, a portion of the harvester thresher, and the mounting means carrying the harvester thresher upon the tractor.

Figures 3 to 10, inclusive, show a mounting means for the front end of the thresher body 18 upon the left-hand tractor axle 15. As seen in these figures, there is provided mounting structure including a torque sleeve 24 formed in halves 25 and 26. The torque sleeve 24 is resistant to twisting for a purpose to be described later. The half 25 is formed of a semicircular sheet 27 and a semicircular casting or forging 28 secured thereto by riveting or welding. Similarly, the half 26 is formed of a semicircular sheet 29 and a casting or forging 30 secured by riveting or welding to the part 29. The halves 25 and 26 are clamped together and surround the left-hand axle 15. At the outer end of the axle 15 there is positioned a roller bearing 31 engaging a live or rotating portion of the axle 15. The roller bearing 31 supports the outer end of the sleeve 24. The inner end of the sleeve 24 is formed of flanges 32 and 33 upon the castings or forgings 28 and 30. These flanges project inwardly and engage an inner dead or stationary housing portion of the axle 15, which in reality houses the rotating live axle. This portion of the axle also has a pair of short longitudinal flanges 34 which cooperate with the flanges 32 and 33 to prevent outward movement of the sleeve 24. The sleeve 24 is formed in the aforementioned halves 25 and 26 so that attachment to and detachment from the axle 15 is facilitated. The halves 25 and 26 are pivotally connected to one another at one end by hinges 35 and 36 connected to the members 25 and 26 and a connecting pin 37 and, at the other end, by hinge portions 38 and 39 integral with the castings or forgings 28 and 30 and a connecting pin 40. The halves 25 and 26 are clamped to one another at one end by outward projections 41 and 42 secured to the parts 28 and 30 and a clamping bolt and nut 43 and 44. At the other end the halves are connected by integral projections 45 and 46 on the castings or forgings 28 and 30 and a clamping bolt and nut 47 and 48. A lifting element 49 projecting from the part 29 and forming a portion of the lifting structure generally in the form of a hook is secured to the semicircular part 29 by bolts 51 threaded into nuts 52 secured to the inside of the semicircular part 29. The forging or casting 30 carries as an integral part thereof a pair of lifting elements or members 53 and 54 formed generally as hooks. As seen in Figure 5, the under side of the thresher body 18 has secured thereto a lift support in the form of brackets 55 and 56. The bracket 55 carries a rotatable roller 57 constructed to be engaged by and positioned in the lifting member 49 during a lifting or lowering operation. Similarly, the bracket 56 carries a rotatable roller 58 positioned within the lifting member 53.

Figures 11, 12, and 13 show the mounting of the rear end of the thresher body 18 upon the front end of the tractor body 11. As seen in these figures there is provided a member 59 having a central portion 60 secured in any desired manner to the tractor body 11. The member 59 extends upwardly and outwardly in curved relation with the portion 60 and terminates in a portion 61 spaced from the portion 60 and extending downwardly. The portion 61 has a slot 62 open at one end in which is mounted a member 63 secured to a part 64. The part 64 is secured to a bracket 65 adjustably secured to the thresher body 18 by means of bolts 66 within elongated slots 67 in the bracket 65 and a threaded bolt 68 secured to and extending through a flange 69 formed on the bracket 65. The threaded bolt 68 extends through a horizontal part 70 of a bracket 71 secured to the thresher body 18, and its vertical position with respect to the part 71 and the thresher body 18 is determined by the position of lock nuts 72 threaded on the bolt 68. By adjustment of these nuts, the position of the bolt 68 is adjusted, and this in turn adjusts the bracket 65, the part 64, and the member 63. Thus, the vertical position of the rear end of the thresher body 18 with respect to the front end of the tractor body 11 is determined. The member 63, secured to the thresher body 18, is retained in the slot 62 by a lifting member 74 pivotally connected by a means 74a positioned on a depending portion 75 on the member 59 below and offset from the securing portion 60 of the member 59. Figure 13 shows a lifting member 74 in a position in which it retains the member 63 within the slot 62. In this position a part 76 secured to the lifting member 74 is locked to a bolt 77 secured to the member 59 by a nut 78 threaded upon the bolt 77.

Figure 10:
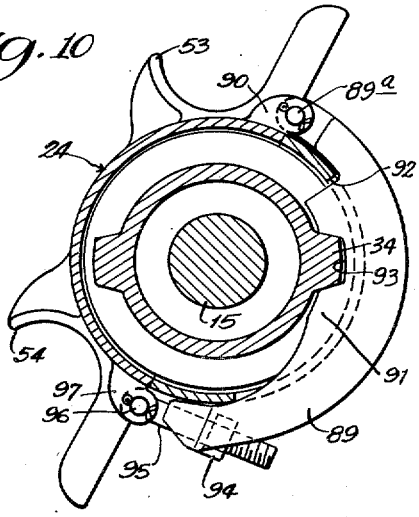
Figure 10 is a sectional view taken on the line 10 of Figure 5, showing the holding means in engaged position.

The tractor body 11 carries a two-armed member 79 that is moved angularly by tractor power. One arm of the member 79 is connected by a link 80 with a bell-crank 81 pivoted at 82 on the tractor body beneath the tractor axles. A link 83 connects the harvester part 19 with the bell-crank 81. Angular movement of the member 79, through application of tractor power, acts through the links 80 and 83 and the bell-crank 81 to raise or lower the harvester part 19. When the harvester thresher 17 is to be dismounted from the tractor 10, the link 80 is disconnected from the power actuated member 79 and the bell-crank 81, and the link 83, from the bell-crank 81 and the harvester part 19. Then the harvester part 19 is raised to the position shown in Figure 3 so as to be free of the axle 15 and is held in this position by a rod 84 connecting the harvesting part 19 with the top of the threshing body 18. Then, a link 85 is connected to one arm of the member 79 and to a flange 86 integral with the casting or forging 28 forming part of the sleeve 24. The other arm of the member 79 is connected by a link 87 with the lifting member 74. Then adjustable supporting feet 88 and 88a, which may be carried as a permanent part of the thresher body 18 or may be attached to it only when the harvester thresher 17 is to be dismounted from the tractor 10, are brought into the position shown in Figure 4. Then, through application of tractor power to the member 79, the mounting sleeve 24 and the lifting member 74 are rotated from their position of Figure 4 to that of Figure 3. Rotation of the sleeve 24 will effect a corresponding rotation of the lifting members 49 and 53 attached to the sleeve 24. Thus, the harvester thresher 17 is lowered until its weight rests upon the feet 88 and 88a now contacting the ground. It has been stated that tractor power is applied to the member 79 to accomplish the dismounting, but this may be true only at the start of this operation, for, when the lifting members have moved only slightly from their position in Figure 4, gravity will act to cause the parts to assume the position of Figure 3, and tractor power will have to be used to resist too rapid a movement to this position. With the harvester thresher 17 in the ground-engaging position of Figure 3, the tractor may simply be backed away from the harvester thresher. The harvester thresher is allowed to remain in its detached, self-supporting position until it is again to be used, at which time the tractor is driven up to the position with respect to the harvester thresher shown in Figure 3. Then tractor power is applied to the member 79 to rotate it and thereby to rotate the sleeve 24 and the lifting members 49, 53, and 74 to bodily lift the implement to a raised and operative position on the tractor. When the harvester thresher 17 has reached the position of Figure 4, the lifting member 74 is locked to the member 59 by the bolt 77 and the nut 78, as shown in Figures 11 and 13. In the mounted position of the harvester thresher 17, the rollers 57 and 58 on the under side of the thresher body 18 are directly over the axle 15. Thus the weight of the harvester thresher applied through the rollers does not tend to twist the sleeve 30. To maintain the rollers 57 and 58 in this position, the sleeve 24 is locked to the axle 15. This is accomplished by means of a latch or locking member 89 pivotally mounted by a pin 89a on an external projection 90 on the casting or forging 30. The part 89 has a portion 91 projected through a slot 92 in the forging 28. A groove 93 in the portion 89 engages one ribbed portion in the form of a longitudinal flange 34 on the axle 15, as shown in Figure 10, and the member 89 is held in this position by means of a nut 94 and a bolt 95 pivotally mounted by a pin 96 on an external projection 97 on the forging 30. Thus, engagement of the flange 34 on the axle 15 by the groove 93 in the member 89, as shown in Figure 10, prevents relative rotation between the sleeve 24 and the axle 15, and the lifting members 49 and 53 are maintained in the position of Figures 7 and 10. As shown in Figure 3, there is formed as part of the thresher body 18 a part 98 that projects downwardly from a point near the rollers 57 and 58 and extends generally beneath these rollers in spaced relation thereto. In the mounted position of the harvester thresher 17, the part 98 engages the under side of the sleeve 24 and thus prevents any upward movement of the rollers 57 and 58 away from the lifting members 49 and 53 that would tend to dismount the harvester thresher 17 from the tractor 10. The sleeve 24 has been described as a torque sleeve resistant to twisting. This must be the case, since there is a tendency to twist, because power for lifting the harvester thresher is applied to the flange 86 at the inner end of the sleeve, and the lifting member 49 is at the outer end of the sleeve.

Figure 6:
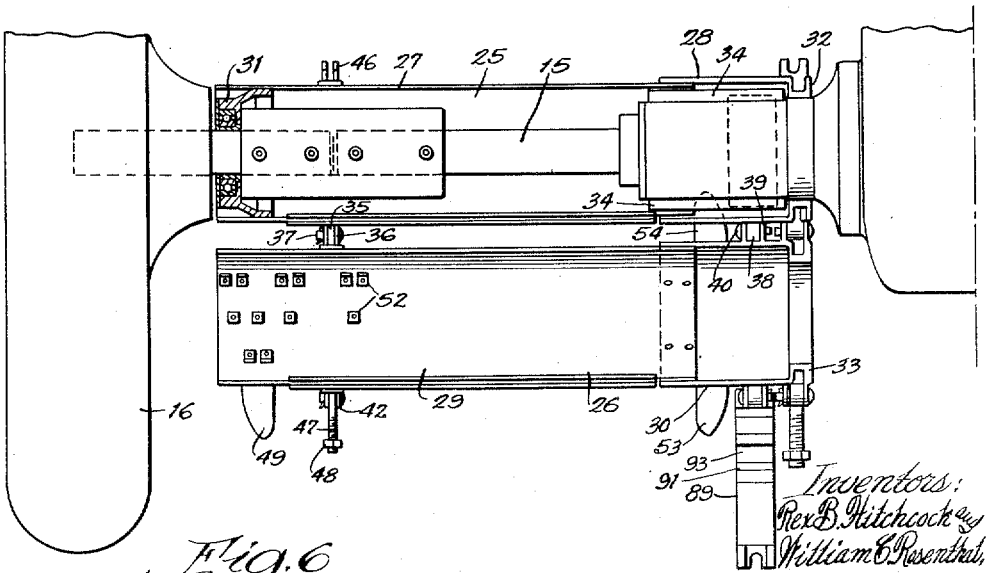
Figure 6 is a similar view of the same portion of the tractor and the mounting means in unfolded position.
Figure 7:
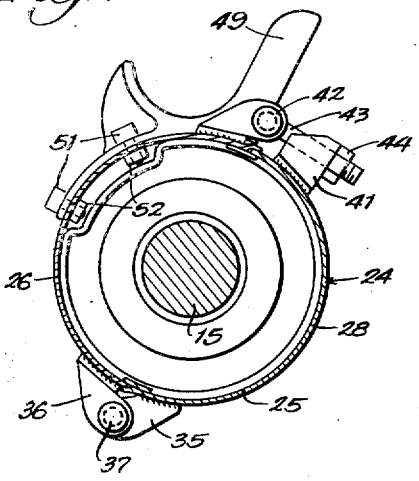
Figure 7 is a sectional view taken on the line 7 of Figure 5.
Figure 8:
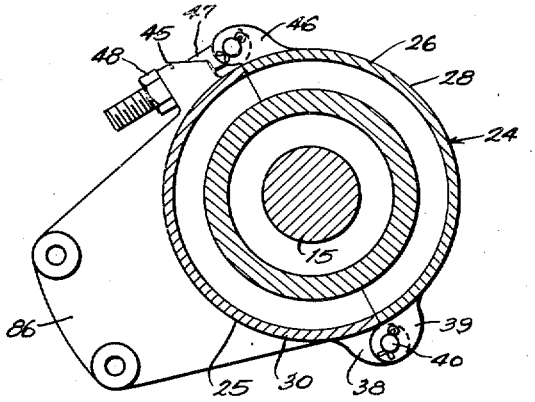
Figure 8 is a sectional view taken on the line 8 of Figure 5.
Figure 9:
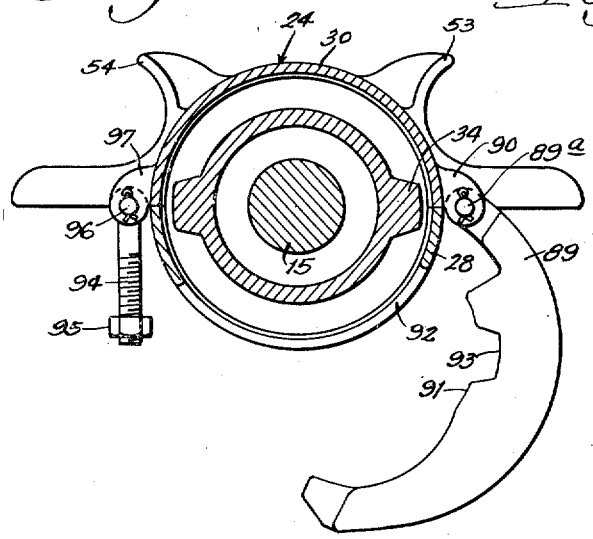
Figure 9 is a sectional view taken on the line 9 of Figure 5 with a certain holding means in disengaged position.

Figure 9 shows that the forging 30 is provided with two lifting members 53 and 54 facing in opposite directions. The use of only the lifting member 53 has been described. The lifting member 54 is used when a machine, such as the harvester thresher 17, is to be mounted upon a long axle extending to the right side of the tractor body 11 rather than to the left side thereof. In this case the sleeve 24 must be reversed, and thus the extra lifting member 54 is required in order that there may be a lifting member in the position corresponding to that occupiel by the lifting member 53 at the left side of the tractor body 11. Only one lifting member 49 has been provided, since it is secured by bolts 51 and nuts 52 to the semicircular part 29 of the sleeve 24. When a machine is to be mounted on an extended axle at the right side of the tractor body 11, the lifting member 49 is detached from the sleeve 24 and is reversed so as to extend in the same direction as the lifting member 54. Figure 6 shows a plurality of nuts 52 attached to the inside of the semicircular part 29. From this it will be seen that the lifting member 49 may not only be reversed but may be also shifted lengthwise of the sleeve 24 to accommodate the mounting of machines of different widths.

Attention is now directed to Figure 14, which shows the lifting member 49 and the roller 57 of the thresher body 18 both in raised position and in lowered position. It will be observed that the lifting member 49 moves angularly so as to shift its lifting surface through a dimension represented by "X." The change in position of the roller 57 from lowered position to lifted position is represented by "Y," and this dimension is less than the dimension "X." The lowest position of the lifting member 49 is such that the member is out of contact with the roller 57 in its lowest position. As the weight of the harvester thresher 17 is shifted from the tractor 10 to the legs 88 and 88a, the tractor 10 will rise somewhat, because the tires on the tractor become round. Thus, the lowest position of the lifting member 49 rises to the dotted line position, as shown. After the harvester thresher 17 has stood on legs 88 and 88a on the ground for some time, the legs may sink into the ground, and the result is a lowering of the harvester thresher and of the roller 57 to the dotted line position shown. The roller 57 in its dotted line position is just above the lifting member 49 in its dotted line position, so that, when the harvester thresher is to be mounted again upon the tractor 10, the lifting member 49 may just be passed beneath the roller 57. Thus, it will be seen that an important feature of the present invention is the lowering of the lifting member 49 through a distance greater than the amount required to bring the feet 88 and 88a of the harvester thresher 17 to the ground. This greater distance serves as a compensation for sinking of the harvester thresher into the ground and rising of the tractor due to removal of the load of the harvester thresher from the tractor.

Figure 15:
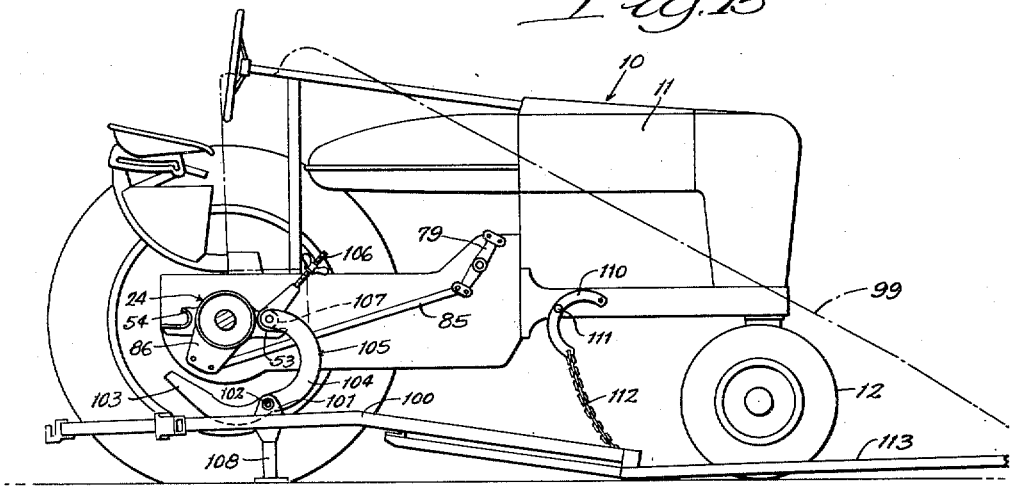
Figure 15 is a side view of a tractor with a modified type of mounting structure and a corn binder detached from the tractor.
Figure 16:
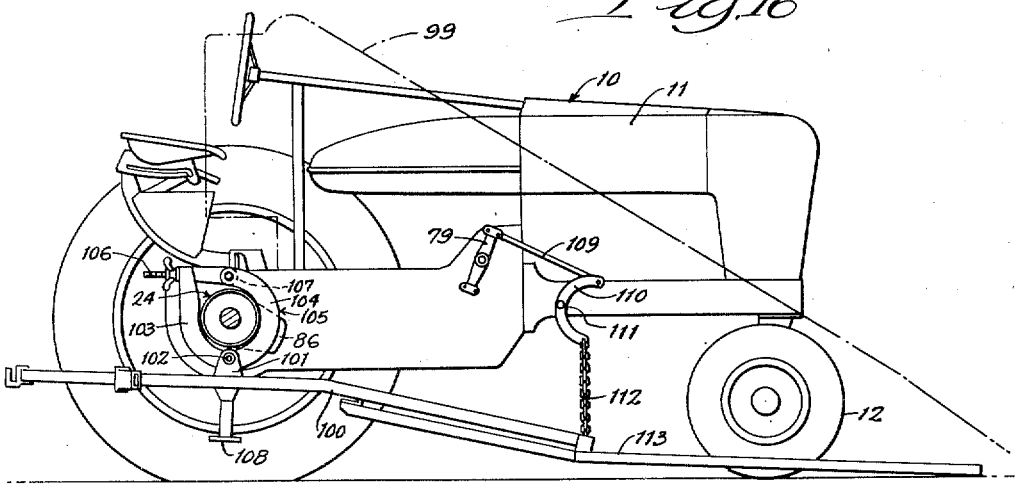
Figure 16 is a similar side view showing one end of the corn binder raised to mounted position on the tractor.
Figure 17:
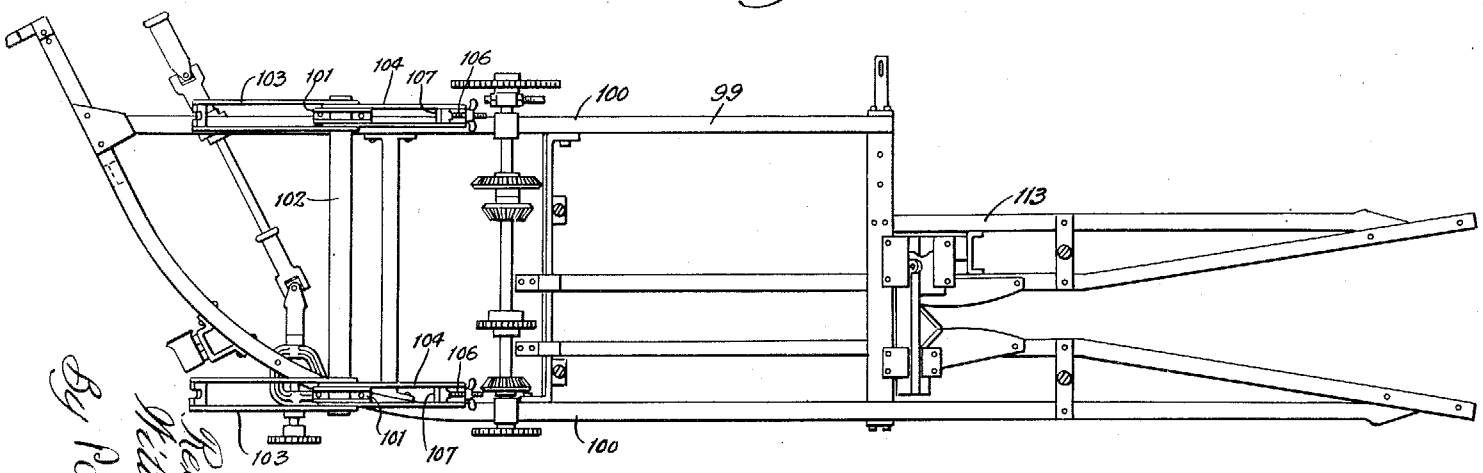
Figure 17 is a plan view of the implement illustrated in Figures 15 and 16 showing the framework of the corn binder.

Figures 15 and 16 illustrate the lifting of a corn binder 99 to mounted position upon a tractor. The corn binder 99 includes a framework comprising longitudinal members 100 (Figure 17). To these members is secured a pair of brackets 101, which supports a transverse tube 102 on which are pivotally mounted halves 103 and 104 of clamps 105 adapted to embrace the sleeve 24 and to be secured to one another by clamping bolts 106. The halves 104 carry rollers 107 similar to rollers 58 and adapted to engage lifting members 49 and 53. Feet 108 support the rear end of the corn binder 99 in the detached position of Figure 15, and the front end rests upon the ground. For attachment of the tractor 10 to the binder, the tractor is driven into the binder as shown in Figure 15. Then the power-actuated member 79, acting through the link 85 and the flange 86, rotates the sleeve 24 and lifting members 49 and 53 to the position of Figure 16. The rollers 107 remain in the lifting members 49 and 53 and cause the rear end of the binder 99 to be raised off the feet 108, as shown in Figure 16. Then the sleeve 24 is locked against angular movement with respect to the tractor axle 15 by the means shown in Figure 10. Then the link 85 is disconnected from the power-actuated member 79 and the flange 86, and a link 109 is connected to the upper end of the member 79 and to a bell-crank 110 pivoted at 111 on the tractor body 11. The bell-crank 110 is connected by a chain 112 with a forward member 113 of the corn binder 99. Adjustment of the power-actuated member 79 acts through the link 109, bell-crank 110, and chain 112 to adjust the forward end of the corn binder 99 upwardly from ground-engaging position to any one of a plurality of positions of adjustment.

The binder has not been shown in detail in the present application, because it forms no part of the present invention. It is used only to illustrate the method of mounting involved. The relation of the binder in mounted position to the tractor is claimed in the copending application of John D. McKahin, Serial No. 490,265, filed June 10, 1943.

A significant feature of the present invention is that the lifting means, namely, the lifting member 74 and the lifting members 49 and 53, are short and act at short radii and move through a substantial angle. Thus they do not take up much space and do not interfere with the use of the tractor for other purposes than that of supporting implements in the manner of the present invention. The lifting means are easy to remove.

Another significant thing is that the lifting means acts to shift the implement from detached position to mounted position onto a natural supporting portion of the tractor axle. When the implement has been mounted upon the tractor axle by the novel means of the present application, it is supported directly upon the axle, and the engaged portions of the implement are directly adjacent the axle. This is so because, as specified in the preceding paragraph, the lifting members 49 and 53 act at a short radius.

The intention is to limit the invention only within the scope of the appended claims.

What is claimed is:

1. In combination, a supporting frame having an axle and ground wheels connected thereto, an implement, a lift support on the implement, a mounting structure for the implement carried by the axle, said structure including an element projecting from the axle and constructed and arranged to be in engagement with said lift support, and means operatively connected to the mounting structure for shifting the mounting structure with respect to the supporting frame to shift the implement bodily between a position in which it is carried by the supporting frame raised and operative and a position in which it rests inoperative upon the ground to enable the supporting frame with the mounting structure thereon to be moved away from the implement.

2. In combination, a supporting frame having an axle and ground wheels connected thereto, an implement positioned adjacent said frame in close proximity to said axle, a lift support on the implement, a mounting structure for the implement carried by the axle and supported thereon on an axis coinciding with the axis of the axle so as to be shiftable about the axle as an axis, said structure having a projecting portion in engagement with said lift support, and means for shifting the mounting structure about the axle to shift the implement bodily between a position in which it is carried by the supporting frame raised and operative and a position in which it rests inoperative upon the ground to enable the supporting frame with the mounting structure thereon to be moved away from the implement.

3. In combination, a tractor having a body, an axle, and a wheel on the axle spaced from the body to provide space for an implement, an implement positioned in said space, a mounting structure on the tractor, said structure having an element in engagement with the implement to be carried by the tractor in said space, and structure for shifting the mounting means with repect to the tractor to shift the implement bodily between a position in which it is carried by the tractor raised and operative and between the wheel and the body and a position in which it rests inoperative upon the ground to enable the tractor with the mounting structure thereon to be moved away from the implement.

4. In combination, a tractor having a power plant, a body, an axle, and a wheel spaced from the body to provide space for an implement, an implement positioned in said space, a mounting structure for the implement to be carried by the tractor, said structure having a projecting lifting element in engagement with said implement, and means connecting the tractor power plant and the mounting structure for shifting the mounting structure with respect to the tractor to shift the implement bodily between a position in which it is carried by the tractor raised and operative between the tractor body and the wheel and a position in which it rests inoperative upon the ground to enable the tractor with the mounting structure thereon to be moved away from the implement.

5. In combination, a tractor, an implement, a lift support on said implement, a mounting structure for the implement having a portion in engagement with said support and carried by the tractor axle, and means operatively connected to the mounting structure for shifting the mounting structure with respect to the tractor to shift the implement bodily between a position in which it is carried by the tractor raised and operative and a position in which it rests inoperative upon the ground to enable the tractor with the mounting structure thereon to be moved away from the implement.

6. In combination, a tractor having an axle, a narrow body, a wheel on said axle spaced from the body and a power plant, an implement adapted to be located between the body and wheel, a lift support on said implement, a mounting structure for the implement in engagement with said support and carried by the tractor axle, and means operatively connected to the mounting structure for shifting the mounting structure with respect to the tractor to shift the implement bodily beween a position in which it is carried by the tractor raised and operative and between the wheel and the body and a position in which it rests inoperative upon the ground to enable the tractor with the mounting structure thereon to be moved away from the implement.

7. In combination, a tractor having a power plant, a body, an axle, and a wheel spaced from the body, an implement having a portion adapted to be engaged for lifting the same, a lift support on said implement, a mounting structure for the implement carried by the tractor axle, said structure having a projecting lifting portion in engagement with said lift support, and means connecting the tractor power plant and the mounting structure for shifting the mounting structure with respect to the tractor whereby said lifting portion is moved to shift the implement bodily between a position in which it is carried by the tractor raised and operative between the tractor body and the wheel and a position in which it rests inoperative upon the ground to enable the tractor with the mounting structure thereon to be moved away from the implement.

8. In combination, a supporting frame having an axle and supporting wheels, an implement, a lift support on the implement, a mounting sleeve surrounding the axle and angularly shiftable about the axle, said sleeve having a lifting element in engagement with said support, and means operatively connected to the mounting structure for shifting the mounting sleeve about the axle to shift the implement bodily between a position in which it is carried by the supporting frame raised and operative and a position in which it rests inoperative upon the ground to enable the supporting frame with the mounting means thereon to be moved away from the implement.

9. In combination, a tractor having a power plant, a body, an axle, and a wheel on the axle spaced from the body, an implement, a torque sleeve serving as a mounting means surrounding the tractor axle and being angularly shiftable about the axle, a lifting member secured to the torque tube adjacent the wheel and in engagement with said implement, and means connecting the tractor power plant and the torque sleeve at a point adjacent the tractor body for angularly shifting the torque sleeve and the lifting member to engage and shift the implement bodily between a position in which it is carried by the tractor raised and operative and between the wheel and the body and a position in which it rests inoperative upon the ground to enable the tractor to be moved away from the implement, the torque sleeve being sufficiently strong to prevent appreciable twisting due to the fact that the lifting member is secured to the sleeve at one end adjacent the wheel and the connection with the tractor power plant is at the other end of the sleeve adjacent the tractor body.

10. In combination, a supporting frame adapted to be moved over the ground, an implement adapted to be mounted upon the supporting frame in a raised position for normal operation during movement of the supporting frame over the ground or to rest upon the ground in a lowered position inoperative and detached from the supporting frame, the implement having a mounting portion, a mounting means on the supporting frame in engagement with the mounting portion on the implement, means pivotally connecting the mounting means to the supporting frame for angular movement of the mounting means between a low position lower than the position of the mounting portion of the implement in its lowered ground-engaging position and a high position higher than said position of the mounting portion, and means operatively connected to the supporting frame and the mounting structure for raising the mounting means from the low position to the high position to engage the mounting portion of the implement and to lift it from lowered ground-engaging position to raised mounted position.

11. In combination, a tractor, an implement adapted to be mounted thereon in a raised position for normal operation during movement of the tractor over the ground or to rest upon the ground in a lowered position inoperative and detached from the tractor, the implement having a mounting portion, a mounting means on the tractor in engagement with the mounting portion on the implement, means pivotally connecting the mounting means to the supporting frame for angular movement of the mounting means between a low position lower than the position of the mounting portion of the implement in its lowered ground-engaging position and a high position higher than said position of the mounting portion, and means operatively connected to the tractor and the mounting structure for raising the mounting means from the low position to the high position to engage the mounting portion of the implement and to lift it from lowered ground-engaging position to raised mounted position.

12. In combination, a tractor having a power plant, an implement adapted to be mounted thereon in a raised position for normal operation during movement of the tractor over the ground or to rest upon the ground in a lowered position inoperative and detached from the tractor, the implement having a mounting portion, a mounting means on the tractor in engagement with the mounting portion on the implement, means pivotally connecting the mounting means to the tractor for angular movement of the mounting means between a low position lower than the position of the mounting portion of the implement in its lowered ground-engaging position and a high position higher than said position of the mounting portion, and means connecting the tractor power plant and the mounting means for raising the mounting means from the low position to the high position to engage the mounting portion of the implement and to lift it from lowered ground-engaging position to raised mounted position.

13. In combination, a supporting frame having an axle and ground wheels on the axle, an implement adapted to be mounted upon the supporting frame in a raised position for normal operation during movement of the supporting frame over the ground or to rest upon the ground in a lowered position inoperative and detached from the supporting frame, the implement having a mounting portion, mounting structure having a portion in engagement with the mounting portion of the implement, means carrying the mounting structure on the axle for angular movement about the axis of the axle between a low position lower than the position of the mounting portion of the implement in a lowered ground-engaging position and a high position higher than said position of the mounting portion, and means operatively connected to the mounting structure for raising the mounting structure from the low position to the high position to engage the mounting portion of the implement and to lift it from lowered ground-engaging position to raised mounted position.

14. In combination, a tractor having a power plant, a body, an axle, and a wheel on the axle spaced from the body, an implement adapted to be mounted upon the tractor in a raised position between the wheel and the body for normal operation during movement of the tractor over the ground or to rest upon the ground in a lowered position inoperative and detached from the tractor, the implement having a mounting portion, mounting means in engagement with the mounting portion of the implement, means supporting the mounting means upon the axle for angular movement about the axis of the axle between a low position lower than the position of the mounting portion of the implement in its lowered, ground-engaging position and a high position higher than the said position of the mounting portion, and means connecting the tractor power plant and the mounting means for raising the mounting means from the low position to the high position to engage the mounting portion of the implement and to lift it from lowered ground-engaging position to raised mounted position.

15. In combination, a tractor having a power plant, a body, an axle, and a wheel on the axle spaced from the body, an implement adapted to be mounted upon the tractor in raised position between the wheel and the body for normal operation during movement of the tractor over the ground or to rest upon the ground in a lowered position inoperative and detached from the tractor, the implement having a mounting portion, a sleeve about the axle having a mounting projection in engagement with the mounting portion of the implement, the sleeve being angularly movable about the axle to shift the mounting projection between a low position lower than the position of the mounting portion of the implement in its lowered, ground-engaging position and a high position higher than the said position of the mounting portion, and means connecting the tractor power plant and the sleeve for shifting the sleeve to move the mounting projection from the low position to the high position to engage the mounting portion of the implement and to lift it from lowered, ground-engaging position to raised mounted position.

16. In combination, a supporting frame having an axle and ground wheels connected thereto, an implement positioned adjacent said axle, a lift support on said implement, a mounting means for the implement carried by the axle so as to be angularly shiftable thereabout, said means having a lifting element thereon, said element being in engagement with said lift support, means operatively connected to said mounting means for angularly shifting the mounting means about the axle to shift the implement bodily between a position in which it is carried by the supporting frame raised and operative and a position in which it rests inoperative upon the ground to enable the supporting frame to be moved away from the implement, and means for locking the mounting means to the axle in the raised position of the implement for maintaining the implement in this position.

17. In combination, a mobile supporting frame, an implement having a mounting portion positioned adjacent said frame, a mounting means for the implement having a mounting portion including a hook carried for vertical swinging movement by the supporting frame, said hook being beneath said mounting portion of the implement in releasable engagement therewith, and means operatively connected to said mounting means for shifting the hook vertically with respect to the supporting frame to engage said mounting portion and to bodily shift the implement vertically between a position in which it rests inoperative upon the ground and the hook may be withdrawn horizontally and a position in which it is carried by the hook raised and operative.

18. In combination, a tractor, an implement positioned alongside the tractor adjacent thereto, lifting means mounted on the tractor adjacent the front thereof, lifting means mounted on the tractor adjacent the rear thereof, both of said lifting means being in releasable engagement with the implement and means operatively connected to said lifting means for conjointly operating the two lifting means to shift the implement between an operative position in which it is raised and mounted on the tractor and an inoperative position in which it is detached from the tractor and rests upon the ground.

19. In combination, a tractor having a power plant provided with a power outlet means intermediate the front and rear of the tractor, an implement positioned alongside the tractor adjacent thereto, lifting means mounted on the tractor adjacent the front thereof, lifting means mounted on the tractor adjacent the rear thereof, both of said lifting means being in releasable engagement with the implement, and means operatively connecting the power plant power outlet means and the two lifting means for conjointly operating the two lifting means to shift the implement between an operative position in which it is raised and mounted on the tractor and an inoperative position in which it is detached from the tractor and rests upon the ground.

20. In combination, a tractor having a body and a rear axle, a first lifting means adjacent the front of the body, a second lifting means on the rear axle adjacent the body, a third lifting means on the rear axle spaced from the body, an implement positioned alongside the tractor adjacent thereto, all three of said lifting means being in releasable engagement with the implement, and means operatively connected to said lifting means for conjointly operating the three lifting means to shift the implement between an operative position in which it is raised and mounted on the tractor and an inoperative position in which it is detached from the tractor and rests upon the ground.

21. In combination, a tractor, a first lifting means mounted adjacent the front of the tractor for rotation about an axis transverse of the tractor, a second lifting means mounted adjacent the rear of the tractor for rotation about an axis transverse of the tractor, an implement positioned alongside the tractor adjacent thereto, both of said lifting means being in releasable engagement with the implement, means operatively connected to said lifting means for conjointly rotating the two lifting means to lift the implement between an operative position in which it is raised and mounted upon the tractor and an inoperative position in which it is detached from the tractor and rests upon the ground.

22. In combination, a tractor having a body and a rear axle, a first lifting means mounted adjacent the front of the body for angular movement about a transverse axis, a second lifting means mounted on the rear axle adjacent the body for angular movement about a transverse axis, a third lifting means mounted on the rear axle spaced from the body for angular movement about a transverse axis, an implement positioned alongside the tractor adjacent thereto, all of said lifting means being in releasable engagement with the implement and means operatively connected to said lifting means for conjointly moving the three lifting means angularly about their axes to shift the implement between an operative position in which it is raised and mounted on the tractor and an inoperative position in which it is detached from the tractor and rests upon the ground.

23. In combination, a tractor having a body, a rear axle, and a wheel on the rear axle spaced from the body, a first lifting means mounted adjacent the front of the body for angular movement about a transverse axis, a second lifting means mounted on the rear axle adjacent the body for angular movement about a transverse axis, a third lifting means mounted on the rear axle adjacent the wheel for angular movement about a transverse axis, a thresher positioned alongside the tractor adjacent thereto, all of said lifting means being in releasable lifting engagement with the thresher, means operatively connected to said lifting means for conjointly moving the three lifting means angularly about their axes to shift the thresher between an operative position in which it is raised from the ground and is mounted on the tractor between the wheel and the body and an inoperative position in which it is detached from the tractor and rests upon the ground.

24. In combination, a tractor having a body, a rear axle, and a wheel on the rear axle spaced from the body, a first lifting means mounted adjacent the front of the body for angular movement about a transverse axis, a second lifting means mounted on the rear axle adjacent the body for angular movement about a transverse axis, a third lifting means mounted on the rear axle adjacent the wheel for angular movement about a transverse axis, a thresher with its rear end adjacent the front of the tractor and its front end adjacent the rear of the tractor, all of said lifting means being in releasable engagement with the implement, and means operatively connected to said lifting means for conjointly moving the three lifting means angularly about their axes to shift the thresher between an operative position in which it is raised from the ground and is mounted on the tractor between the wheel and the body and an inoperative position in which it is detached from the tractor and rests upon the ground, the tractor body being adapted in its mounted position to carry pivotally at its rear end a harvester platform extending rearwardly from the rear axle.

25. In combination, a tractor having an axle, a lifting member angularly movable about the tractor axle, an implement having a portion in engagement with the lifting member and a part depending from the implement at a point adjacent the portion and extending beneath the portion in spaced relation thereto, and means operatively connected to said lifting means for angularly moving the lifting member to raise the implement bodily from an inoperative position in which it rests upon the ground detached from the tractor to an operative position in which the lifting member holds the said portion of the implement above the axle and the depending part of the implement engages the bottom of the axle to prevent detachment of the implement from the tractor due to upward movement of the portion of the implement away from the lifting member.

26. In combination, a tractor having a rear ax'e having a longitudinal flange, an implement-lifting member, mounting means for the lifting member mounted upon the tractor axle for angular movement thereabout, an implement having a lifting portion in operative engagement with said lifting member, means operatively connected to said lifting means for angularly moving the mounting means and lifting member to shift the implement between an operative position in which it is raised and mounted on the tractor and an inoperative position in which it rests on the ground, a locking element pivotally mounted on the mounting means projectible into engagement with the flange on the tractor axle in raised position of the implement, and means for maintaining the part in engagement with the flange to hold the implement in raised position.

27. In combination, a tractor having a rear axle having a ribbed portion, an implement, a sleeve mounted upon the axle for relative angular movement thereabout and being formed in halves to enable connection to and disconnection from the axle, a lifting member secured to the sleeve, means operatively connected to said sleeve and to the tractor for angularly moving the sleeve and lifting member, said lifting member being in engagement with the implement to raise the implement from an inoperative position in which it rests upon the ground to an operative position in which it is raised and mounted on the tractor, a locking element mounted upon the sleeve and projectible thereinto to engage the ribbed portion of the tractor axle in raised position of the implement to prevent angular movement of the sleeve and lifting member and thereby to maintain the implement in raised position.

28. In combination, a tractor having an axle having a radial projection, a mounting means carried by the axle for relative angular movement thereabout, a lifting member secured to the mounting means, an implement having a portion in engagement with the lifting member and a projecting part near said portion, means operatively connected to the mounting means and the tractor for angularly moving the mounting means and the lifting member to raise the implement from an inoperative position in which it rests upon the ground to an operative position in which it is raised and mounted on the tractor, in raised position of the implement the said portion of the implement being above the tractor axle and the projecting part of the implement engaging the mounting means below the tractor axle to prevent upward movement of the said portion of the implement away from the mounting member, and a locking element pivotally connected to the mounting means and insertable thereinto to engage the projection on the tractor axle in raised position of the implement to prevent angular movement of the mounting means and the lifting member and thereby to hold the implement in raised position.

29. In combination, a tractor having an axle structure provided with an axle having an exposed live portion at its outer end, a mounting means provided with a projecting lifting member surrounding the axle structure, an anti-friction bearing journaling the mounting means upon the live portion of the axle, an implement, a lifting support on said implement in engagement with said lifting member, and means for shifting the mounting means about the axle to thereby shift the implement between an operative position in which it is raised and mounted upon the tractor and an inoperative position in which it rests upon the ground.

30. In combination, a tractor having a power plant, lifting means on the tractor, an implement positioned adjacent the tractor in lifting engagement with said lifting means at two spaced points, means for causing the power plant to actuate the lifting means at one point of engagement to raise the implement from a position in which it rests upon the ground detached from the tractor to a position in which one end of the implement is raised, and means for causing the tractor power plant to act through the lifting means at the other point of engagement with the implement spaced from the lifting means toward the other end of the implement to adjust the said other end of the implement upwardly from engagement with the ground about the pivotal mounting.

31. In combination, a tractor having a power plant, a body, an axle, and a wheel on the axle spaced from the body determining a wheel line spaced from the body, an implement positioned alongside the tractor between the body and said spaced wheel, lifting means mounted on the tractor axle in releasable engagement with said implement, means connected to said lifting means and to the power plant of the tractor for causing the power plant to actuate the lifting means to raise the implement from a position in which it rests upon the ground detached from the tractor to a position in which the implement is mounted on the tractor axle between the body and the wheel line with one end raised and with a pivotal mounting adjacent the tractor axle, and means for causing the tractor power plant to act through a point of the implement spaced from the pivotal mounting toward the other end of the implement to adjust the said other end of the implement upwardly from engagement with the ground about the pivotal mounting.

32. In combination, a tractor having a body, an axle, a wheel on the axle spaced from the body determining a wheel line spaced from the body, a power plant having a power outlet connection at the side of the body, lifting means mounted on the tractor axle for angular movement thereabout, an implement positioned alongside the tractor adjacent thereto, said lifting means being in engagement with said implement link means connectable between the outlet of the power plant and the lifting means for causing the tractor power plant to act through the lifting means to raise the implement from a position in which it rests on the ground detached from the tractor to a position in which the implement is mounted on the tractor axle between the wheel line and the body with the rear end raised and with a pivotal mounting adjacent the rear axle, a second lifting means connected to the tractor spaced from the first mentioned lifting means and being arranged in engagement with the implement and a second link means connectable between the power outlet of the tractor power plant and said second lifting means upon disconnection of the first link means for causing the tractor power plant to adjust the front end of the implement upwardly from ground engagement.

33. In combination, a tractor having a power plant, lifting means on the tractor, an implement positioned alongside the tractor adjacent thereto and in engagement with the lifting means, means operatively connected to said lifting means for causing the power plant to actuate the lifting means to raise the implement from a position in which it rests upon the ground detached from the tractor to a position in which one end of the implement is raised, means for securing said end of the implement to the tractor, and means operatively connected to said lifting means for thereafter actuating the tractor power plant to lift the other end of the implement.

34. In combination, a tractor having an axle, lifting means pivotally mounted on the axle for angular movement thereabout, an implement having a portion in engagement with the lifting means, and means operatively connected to the tractor and to said lifting means for shifting the lifting means about the axle for raising the implement from a position in which it is unsupported on the tractor with the said portion thereof is immediately alongside the axle to a position in which the implement is mounted on the tractor and the said portion thereof is immediately over the axle.

35. In combination, a tractor having a body, an axle and a wheel on the axle spaced from the body, an implement positioned alongside the tractor adjacent thereto, a mounting structure carried by and on the tractor, said structure having means in engagement with the implement to be carried by the tractor, and means operatively connected to said mounting structure for shifting the mounting structure with respect to the tractor to shift the implement bodily between a position in which it is carried by the tractor raised and operative and between the wheel and the body and a position in which it rests inoperative upon the ground to enable the tractor with the mounting structure thereon to be moved away from the implement.

36. In combination, a tractor having a body, an axle and a wheel on the axle spaced from the body, an implement positioned alongside the tractor adjacent thereto, a mounting structure carried by and on the tractor, said structure having lifting means in engagement with the implement to be carried by the tractor, and power actuated means operable by the power plant of the tractor for shifting the mounting structure with respect to the tractor to shift the implement bodily between a position in which it is carried by the tractor raised and operative and between the wheel and the body and a position in which it rests inoperative upon the ground to enable the tractor with the mounting structure thereon to be moved away from the implement.

37. In combination, a tractor having a body, an axle and a wheel on the axle spaced from the body, an implement positioned alongside the tractor body, a mounting means for said implement to be carried by the tractor, said mounting means including a member in engagement with the implement and the tractor at one point and another member in engagement with the implement at another point spaced longitudinally of the tractor from said last named point, means operatively connected to said mounting means for shifting the mounting means with respect to the tractor to shift the entire implement bodily clear of the ground between a position in which it rests inoperative upon the ground to enable the tractor with the mounting means thereon to be moved away from the implement and a position in which it is carried by the tractor raised and operative and between the wheel and the body, and means to secure the implement rigidly to the tractor.

38. In combination, a tractor having a body, a power plant on the body, a narrow front rolling support, an axle and a wheel on the axle spaced from the body, an implement positioned alongside the tractor body between the wheel and the body, a mounting means for the implement to be carried by the tractor, said mounting means including a member in engagement with the implement and the tractor at one point and another member in engagement with the implement at another point spaced longitudinally of the tractor from said last named point, manually controlled power actuated means operable by the power plant of the tractor for shifting the entire implement bodily clear of the ground between a position in which it rests inoperative upon the ground to enable the tractor with the mounting means thereon to be moved away from the implement, and means to secure the implement rigidly to the tractor.

39. In combination, a tractor having a body, an axle and a wheel on the axle spaced from the body, an implement positioned alongside the tractor body between the wheel and the body and adapted to be carried by the tractor, a mounting means for said implement having a lifting element in engagement with said implement, said means including lifting mechanism operatively connected to said means and to the tractor arranged and constructed and operable to simultaneously shift all portions of the implement vertically relative to the ground and releasable mechanism to lock the implement on the tractor, said mounting means being connected to the tractor and supportable thereby, means for shifting the mounting means with respect to the tractor to shift the entire implement bodily and substantially vertically between a position in which it is carried by the tractor raised and operative and between the wheel and the body and a position in which it rests inoperative upon the ground.

40. In combination, a tractor having a body, an axle and a wheel on the axle spaced from the body, an implement positioned alongside the tractor body between the wheel and the body adapted to be carried by the tractor, a mounting means for said implement having a portion of lifting engagement with said implement, said means connected to the mounting means and to the tractor including lifting mechanism arranged and constructed and operable to simultaneously shift all portions of the implement vertically relative to the ground and releasable mechanism to lock the implement on the tractor, said mounting means being connected to the tractor and supported thereby, manually controlled power actuated means operable by the power plant of the tractor for shifting the mounting means with respect to the tractor to shift the entire implement bodily and substantially vertically between a position in which it is carried by the tractor raised and operative and between the wheel and the body and a position in which it rests inoperative upon the ground to enable the tractor with the mounting means thereon to be moved away from the implement.

41. In combination, a mobile supporting frame having a connecting part, an implement frame including a connecting part, a mounting means for the implement including the aforesaid parts and a hook carried by one of the parts, said hook being in engagement with a hook-receiving portion on the other part, and means operatively connected to the mounting means and to the tractor for shifting the hook vertically with respect to said other part to engage the hook-receiving portion to shift the implement vertically between a position in which it rests inoperative upon the ground to an operative position in which it is carried by means of the hook and hook-receiving portion.

REX B. HITCHCOCK.
WILLIAM C. ROSENTHAL.

REFERENCES CITED

The following references are of record in the file of this patent:

UNITED STATES PATENTS

| Number | Name | Date |
|---|---|---|
| 1,404,069 | Swinehart | Jan. 17, 1922 |
| 2,259,893 | Hyman | Oct. 21, 1941 |
| 2,347,871 | Andrews et al. | May 2, 1944 |